J. C. DAUGHERTY.
Plow Fender.
No. 59,191.  Patented Oct. 30, 1866.
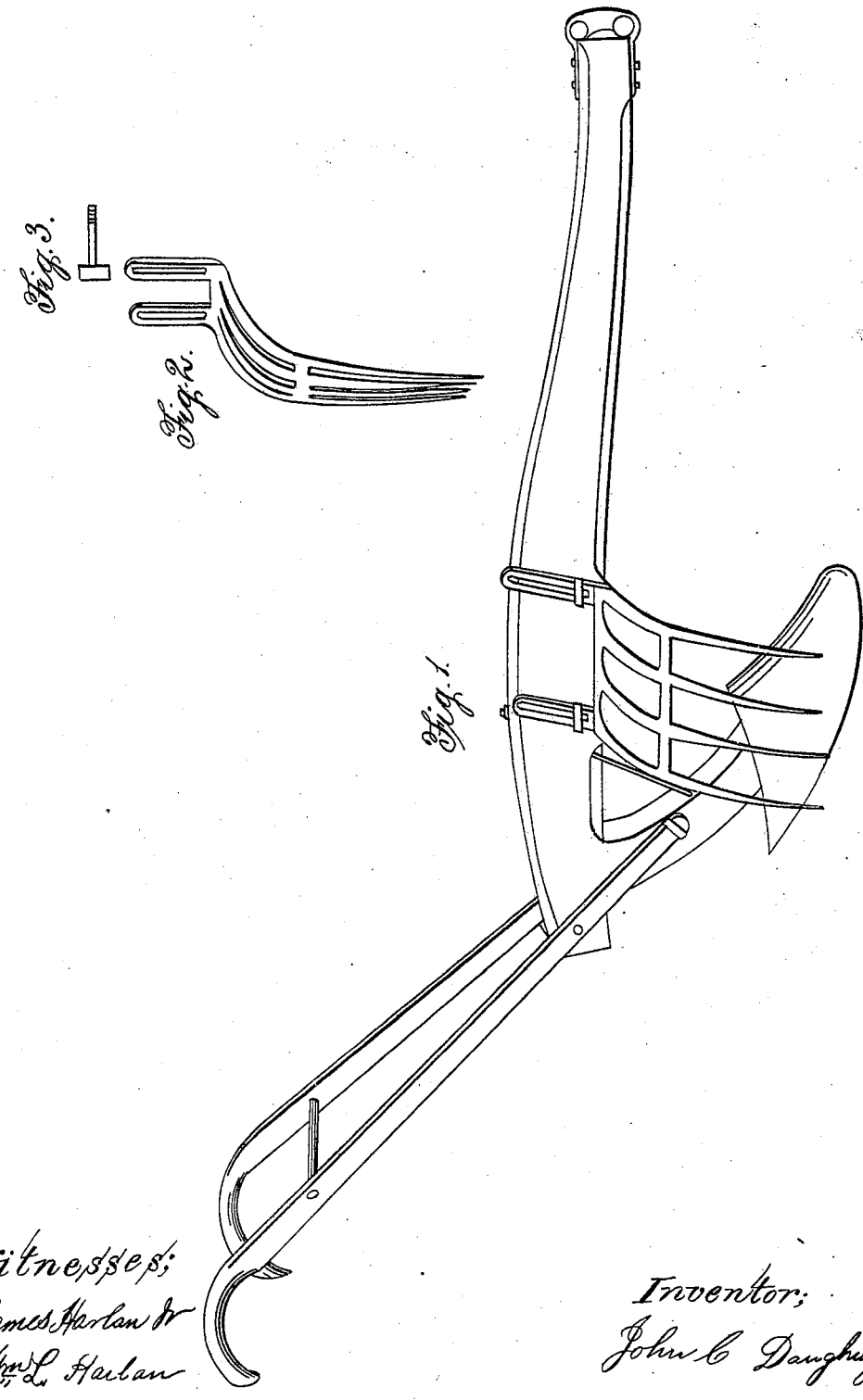

UNITED STATES PATENT OFFICE.

JOHN C. DAUGHERTY, OF BRIDGEPORT, KENTUCKY.

IMPROVEMENT IN SHOVEL-PLOWS.

Specification forming part of Letters Patent No. 59,191, dated October 30, 1866.

*To all whom it may concern:*

Be it known that I, JOHN C. DAUGHERTY, of Bridgeport, in the county of Franklin and State of Kentucky, have invented a new and useful improvement on the plow for fending clods from young corn or other thing required or which may be plowed, and pulverizing the earth in plowing; and I do hereby declare that the following is a full, clear, and exact description of the construction and operation of the same, reference being had to the annexed drawings, making a part of this specification, in which—

Figure 1 represents a side view, and Fig. 2 a view from the front; Fig. 3, bolt-fastening fender to the beam.

The improvement is called the "clod-fender," and is composed of four metal rods, held and fastened together by two bars, one near the beam of the plow and the other near the center of the rods, forming a compact and secure frame-work, which is to be fastened to the beam of the plow by bolts in sliding mortises, fixed when in use, but made so it can be lengthened or shortened, as may be needed, the bars curved so that the points at the ground will fall outside of the edge of the shovel from one to three inches, the rods slanting from the front backward sufficient to prevent them from coming dead against a fixed obstruction. The curve is also used, instead of a straight rod slanting out, so as to leave space for the accumulated earth to pass over the shovel. The fender can be used on either side of any one-horse plow, it being fastened by bolts with nuts. The rods are to touch or slightly go into the ground, and their length will depend upon the plow. The average distance apart will be about two inches at the point, and vary with the plow; the average diameter of rods, half-inch, but may vary in strength or lightness to suit the ground and size of plow. The rods, may be made of tough wood where the soil is light and easily worked. The fender may be attached to any plow, but is intended for the shovel-plow, and its purpose and practical workings will be to protect corn or other thing plowed from being covered with clods or soil, and to pulverize the clods and soil. When sides are changed the shape must also.

The undersigned claims for each and every part of the fender described as above. He makes no claim for the plow or any part thereof but the fender, and disclaims everything except the fender.

J. C. DAUGHERTY.

Witnesses:
JAMES HARLAN, Jr.,
JAS. G. HATCHITT.